US012470904B2

(12) United States Patent
Alathur et al.

(10) Patent No.: US 12,470,904 B2
(45) Date of Patent: *Nov. 11, 2025

(54) PROXIMITY-BASED CONNECTION FOR BLUETOOTH DEVICES

(71) Applicant: Bose Corporation, Framingham, MA (US)

(72) Inventors: Pramodh Guruswamy Alathur, Shrewsbury, MA (US); Naganagouda Patil, Westborough, MA (US); Santiago Carvajal, Sagamore Beach, MA (US); Benjamin Colin Burns, Somerville, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,155

(22) Filed: Feb. 15, 2024

(65) Prior Publication Data

US 2024/0187832 A1 Jun. 6, 2024

Related U.S. Application Data

(63) Continuation of application No. 17/714,253, filed on Apr. 6, 2022, now Pat. No. 11,937,159.

(51) Int. Cl.
*H04W 4/80* (2018.01)
*H04W 76/10* (2018.01)

(52) U.S. Cl.
CPC ............ *H04W 4/80* (2018.02); *H04W 76/10* (2018.02)

(58) Field of Classification Search
CPC ....... H04W 4/80; H04W 76/14; H04W 76/10; H04W 52/245; H04B 17/318
See application file for complete search history.

(56) References Cited

U.S. PATENT DOCUMENTS

| 9,066,327 B2 | 6/2015 | Liu |
| 10,491,734 B1 | 11/2019 | Annasagaram Krishnamurthy et al. |
| 10,743,165 B1 | 8/2020 | Patel et al. |
| 2012/0003932 A1 | 1/2012 | Zhodzishsky |
| 2012/0115464 A1 | 5/2012 | Jang |

(Continued)

FOREIGN PATENT DOCUMENTS

| CN | 110972058 A | 4/2020 |
| CN | 113316222 A | 8/2021 |

(Continued)

OTHER PUBLICATIONS

PCT International Search Report and Written Opinion for International Application No. PCT/US2023/017569, dated Jul. 3, 2023, 68 pages.

*Primary Examiner* — Tuan H Nguyen
(74) *Attorney, Agent, or Firm* — Hoffman Warnick LLC (57) ABSTRACT

Various implementations include approaches for establishing a Bluetooth (BT) connection between devices. One example approach includes: in response to a trigger at a first BT device, attempting to determine a received signal strength indicator (RSSI) from a set of additional BT devices paired to the first BT device, and in response to determining a first additional BT device has a highest RSSI from the set of additional BT devices, attempting at the first BT device to make a BT connection with the first additional BT device.

20 Claims, 4 Drawing Sheets

(56) References Cited

U.S. PATENT DOCUMENTS

| | | |
|---|---|---|
| 2014/0256260 A1 | 9/2014 | Ueda et al. |
| 2018/0370758 A1 | 12/2018 | Huang et al. |
| 2020/0053611 A1 | 2/2020 | Jorgovanovic ........ H04W 36/03 |
| 2020/0107127 A1 | 4/2020 | Gong et al. |
| 2020/0128394 A1 | 4/2020 | Han ..................... H04W 76/11 |
| 2022/0361264 A1 | 11/2022 | Burns et al. |

FOREIGN PATENT DOCUMENTS

| | | | | |
|---|---|---|---|---|
| CN | 113411794 | * | 9/2021 | .............. H04W 4/80 |
| CN | 113411794 A | | 9/2021 | |
| KR | 20160003068 U | | 9/2016 | |
| KR | 20190037918 | * | 4/2019 | ............ H04W 76/10 |
| KR | 20190037918 A | | 4/2019 | |

\* cited by examiner

PROXIMITY-BASED CONNECTION FOR BLUETOOTH DEVICES

PRIORITY CLAIM

This application is a continuation filing of, and claims priority to, co-pending U.S. patent application Ser. No. 17/714,253 (Proximity-Based Connection for Bluetooth Devices), the entire contents of which are incorporated by reference herein.

TECHNICAL FIELD

This disclosure generally relates to device connection. More particularly, the disclosure relates to establishing a Bluetooth connection between previously paired devices.

BACKGROUND

While Bluetooth pairing and connection has significant benefits, one shortcoming of traditional Bluetooth connection occurs during the attempted connection phase between already paired devices (e.g., a source device and a sink device). Conventional approaches for connecting two devices over Bluetooth include attempting to connect a sink (also referred to as an "output", "destination", or "peripheral") device with a most recently connected source (also referred to as an "input" or "host") device in a list of already paired devices. However, these approaches often fail to connect the desired devices.

SUMMARY

All examples and features mentioned below can be combined in any technically possible way.

Various implementations include approaches for establishing a Bluetooth (BT) connection between devices. Additional implementations include BT devices configured to establish a BT connection with another device.

In some particular aspects, a method includes: in response to a trigger at a first BT device, attempting to determine a received signal strength indicator (RSSI) from a set of additional BT devices paired to the first BT device; if an RSSI from a first additional BT device is a highest RSSI from the set of additional BT devices and exceeds an RSSI from a second additional BT device with a second-highest RSSI by a threshold, selecting the first additional BT device for connection with the first BT device; and if a difference between the RSSI from the first additional BT device and the RSSI from the second additional BT devices does not exceed the threshold, selecting either the first additional BT device or the second additional BT device for connection with the first BT device based on a BT connection hierarchy for the set of additional BT devices paired to the first device.

In additional particular aspects, a first BT device includes: a BT radio; and a controller coupled with the BT radio and configured to control a BT connection by, in response to a trigger at the first BT device, attempting to determine a received signal strength indicator (RSSI) from a set of additional BT devices paired to the first BT device, if an RSSI from a first additional BT device is a highest RSSI from the set of additional BT devices and exceeds an RSSI from a second additional BT device with a second-highest RSSI by a threshold, selecting the first additional BT device for connection with the first BT device, and if a difference between the RSSI from the first additional BT device and the RSSI from the second additional BT devices does not exceed the threshold, selecting either the first additional BT device or the second additional BT device for connection with the first BT device based on a BT connection hierarchy for the set of additional BT devices paired to the first device.

In further particular aspects, a method includes: in response to a trigger at a first BT device, attempting to determine a received signal strength indicator (RSSI) from a set of additional BT devices paired to the first BT device, and in response to determining a first additional BT device has a highest RSSI from the set of additional BT devices, attempting at the first BT device to make a BT connection with the first additional BT device.

In additional particular aspects, a first BT device includes: a BT radio; and a controller coupled with the BT radio and configured to control a BT connection by, in response to a trigger at the first BT device, attempting to determine a received signal strength indicator (RSSI) from a set of additional BT devices paired to the first BT device, and in response to determining a first additional BT device has a highest RSSI from the set of additional BT devices, attempting to make a BT connection with the first additional BT device.

Implementations may include one of the following features, or any combination thereof.

In certain implementations, the determined highest RSSI and the determined second-highest RSSI include normalized values based on a type of each of the first additional BT device and the second additional BT device.

In particular cases, the set of additional BT devices paired to the first BT device have each previously connected with the first BT device with a BT connection and are not currently connected with the first BT device.

In some aspects, the threshold accounts for a margin of uncertainty in the RSSI.

In certain cases, the margin of uncertainty is greatest when the highest RSSI and the next-highest RSSI indicates proximity of up to approximately two feet to approximately three feet relative to the first BT device.

In particular aspects, the trigger includes a command to connect with a previously paired device and is a distinct command from a new device connection command.

In some implementations, the trigger and the new device connection command are both interface commands enabled at an interface on the first BT device.

In certain cases, the BT connection hierarchy for the set of additional BT devices is prioritized based on at least one of: a recentness of connection with the first BT device, a frequency of connection with the first BT device, a known RSSI characteristic of the additional BT device, whether the additional BT device is currently outputting audio, whether the additional BT device was recently powered on, a user-defined priority, a BT profile of a last connection with the first BT device, or a recent sweep of proximity to the first BT device.

In some aspects, if at least two BT devices in the set of additional BT devices return an RSSI response, the RSSI response from each of the at least two additional BT devices is used as a primary factor for selecting the BT device from the set of additional BT devices, and the BT connection hierarchy is used as a secondary factor in selecting the BT device from the set of additional BT devices.

In certain cases, in a paired configuration, the first BT device is a sink BT device and the additional BT devices are source BT devices.

In particular aspects, the RSSI from each of the additional BT devices is received within approximately two seconds to approximately three seconds.

In certain implementations, physical separation of approximately six inches to approximately one foot, relative to the first BT device, is detectable by a distinction between the highest RSSI and the second-highest RSSI.

In some cases, in response to receiving the trigger while the first BT device is connected to the first additional BT device with the highest RSSI, selecting the second additional BT device with the second-highest RSSI for connection.

In particular implementations, the trigger includes at least one of: detecting movement of the first BT device to a new location, detecting a change in the time of day, detecting BT range between the first BT device and at least one of the additional BT devices, providing an input at the first BT device, initiating charging of another device, mechanically actuating the first BT device, receiving an input from one of the additional BT devices, detecting a change in BT state of the first BT device, detecting a change in power state of the first BT device, detecting loss of an existing BT connection with the first BT device, or detecting loss of an existing Wi-Fi connection with the first BT device.

In certain aspects, in a multi-point connection mode, prior to selecting the first additional BT device or the second additional BT device, the process includes maintaining a BT connection with a currently connected BT device after detecting the trigger.

In particular cases, the method further includes disregarding an RSSI from the currently connected BT device either before or after receiving an RSSI from the set of additional BT devices paired to the first device.

In some aspects, in a multi-point connection mode, the trigger includes a power-up command, and in response to the power-up command and prior to selecting the first additional BT device or the second additional BT device, the process includes connecting with both the first additional BT device and the second additional BT device, and disconnecting with one of the first additional BT device or the second additional BT device not selected for connection.

In certain implementations, the multi-point connection mode is selectable via a user interface command.

In particular cases, the BT device further includes an electro-acoustic transducer coupled with the controller for providing an audio output, where the determined highest RSSI and the determined second-highest RSSI include normalized values based on a type of each of the first additional BT device and the second additional BT device.

In certain aspects, a method further includes, making the BT connection with the first additional BT device, and automatically taking an additional action in response to the BT connection.

In some cases, automatically taking the additional action is performed without further user intervention.

In certain aspects, the additional action includes at least one of, launching an application at the first BT device, initiating an audio output at the first BT device, applying personalization settings to the first BT device, setting a predefined volume level at one or both of the first BT device or the first additional BT device, adjusting a sound output configuration at one or both of the first BT device or the first additional BT device, or changing at least one of transmit parameters or receive parameters between the first BT device and the first additional BT device.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that selecting a Bluetooth (BT) device for connection can be enhanced by determining a received signal strength indicator (RSSI) from one or more devices in a paired device list. For example, a connection approach relying on RSSI can improve the likelihood of connecting the desired BT devices as compared with conventional recency-focused (or priority-focused) approaches, thereby saving time and enhancing the user experience.

In particular cases, in response to a trigger at a first BT device, an approach includes attempting to determine an RSSI of a set of additional paired BT devices (paired with the first device). If the RSSI of a first additional (paired) BT device is the highest RSSI from the set of devices and exceeds the next-highest RSSI from a second additional (paired) BT device in the set by a threshold, that first additional BT device is selected for connection with the first BT device. However, if a difference between the RSSI from the first additional BT device and the second additional BT devices does not exceed the threshold, selection is made between the first and second additional BT devices based on a BT connection hierarchy for the set of additional BT devices. Because RSSI is a strong indicator of physical proximity and provides a reliable signal, the RSSI-based approaches described herein enhance the likelihood of connecting a desired set of (previously) paired BT devices. That is, these approaches rely at least in part on the assumption that users wish to connect BT devices within a proximity range, and not necessarily based on a most recent connection or frequency of connections between devices.

Commonly labeled components in the FIGURES are considered to be substantially equivalent components for the purposes of illustration, and redundant discussion of those components is omitted for clarity.

Figure 1:
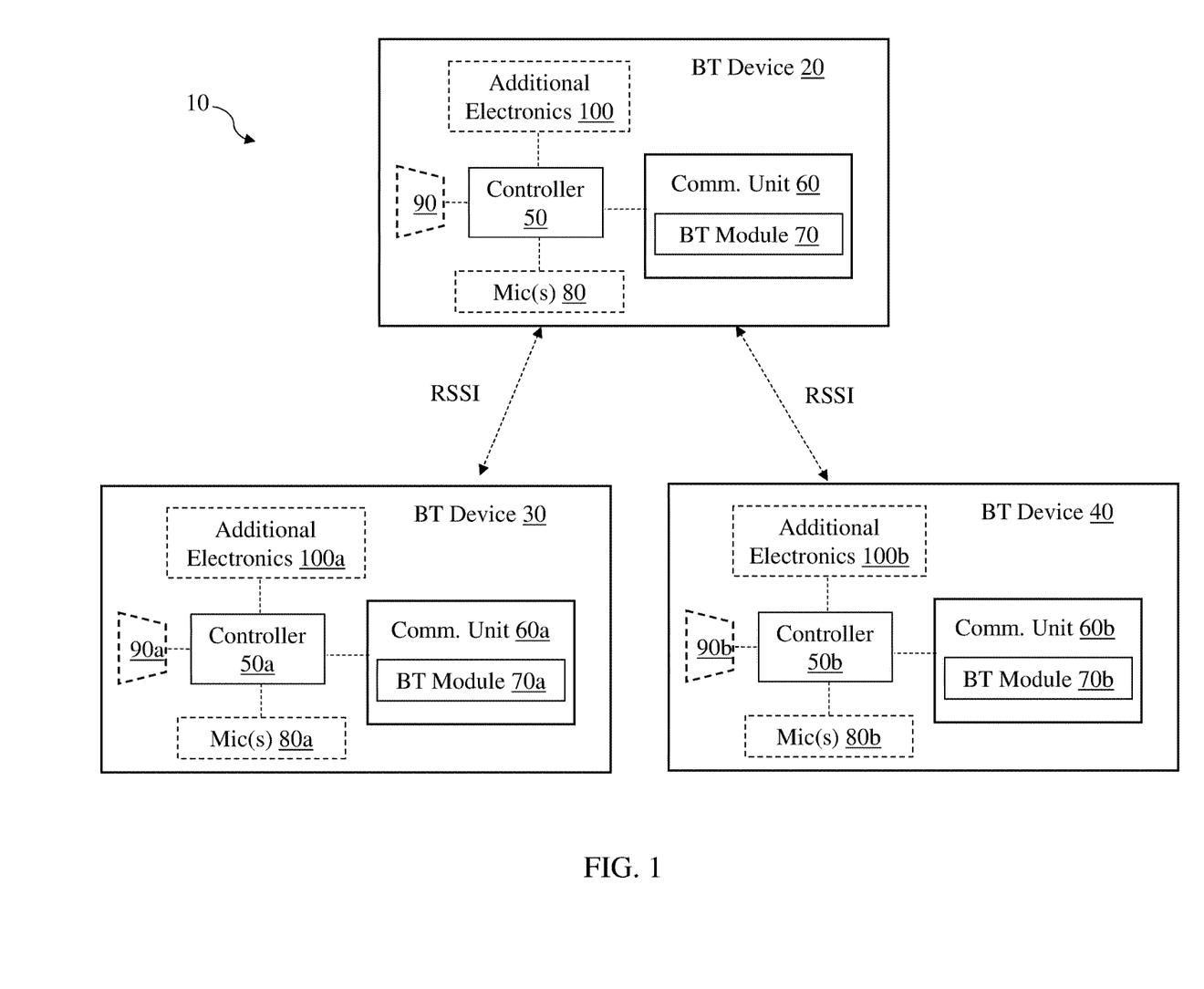
FIG. 1 is a block diagram of a system including Bluetooth enabled audio devices according to various disclosed implementations.

FIG. 1 shows an example of a system 10 including a set of Bluetooth-enabled devices (or simply, Bluetooth devices, or BT devices) according to various implementations. As noted herein, Bluetooth-enabled devices include a Bluetooth radio or other Bluetooth-specific communication system enabling connection over Bluetooth protocol. System 10 includes a first BT device 20, and an additional (or, second) BT device 30. In this example, system 10 also includes a further additional (or, third) BT device 40. In the example illustrated in FIG. 1, first BT device 20 is a BT sink device (otherwise referred to as an "output device", "destination device", or "peripheral device"), and additional BT devices 30, 40 are BT source devices (otherwise referred to as "input device", or "host device"). Example Bluetooth-enabled source devices (e.g., additional devices 30, 40), include, but are not limited to, a smartphone, a tablet computer, a personal computer, a laptop computer, a notebook computer, a netbook computer, a radio, an audio system (e.g., portable and/or fixed), an Internet Protocol (IP) phone, a communication system, an entertainment system, a headset, a smart speaker, a piece of exercise and/or fitness equipment, a portable media player, an audio storage and/or playback system, a smart watch or other smart wearable device, and so forth. Example Bluetooth-enabled sink devices (e.g., first BT device 20) include, but are not limited to, a headphone, a headset, an audio speaker (e.g., portable and/or fixed, with or without "smart" device capabilities), an entertainment system, a communication system, a smartphone, a vehicle audio system, a piece of exercise and/or fitness equipment, an out-loud (or, open-air) audio device, a wearable private audio device, and so forth. Additional BT devices can include a portable game player, a portable media player, an audio gateway, a BT gateway device (for bridging BT connection between other BT-enabled devices), an audio/video (A/V) receiver as part of a home entertainment or home theater system, etc. A Bluetooth-enabled device as described herein may change its role from source to sink or sink to source depending on a specific application.

The Bluetooth-enabled first device 20 can include a controller 50 and a communication (comm.) unit 60 coupled with the controller 50. The communication unit 60 includes a Bluetooth module 70 (e.g., including a Bluetooth radio), enabling communication with other devices over Bluetooth protocol. In certain example implementations, BT device 20 can also include one or more microphones (mic(s)) 80 (e.g., a single microphone or a microphone array), and an electro-acoustic transducer 90 for providing an audio output. The BT device 20 can also include additional electronics 100, such as a power manager and/or power source (e.g., battery or power connector), memory, sensors (e.g., IMUs, accelerometers/gyroscope/magnetometers, optical sensors, voice activity detection systems), etc. In some cases, the memory may include a flash memory and/or non-volatile random access memory (NVRAM). In particular cases, memory stores: a microcode of a program for processing and controlling the controller 50 and a variety of reference data; data generated during execution of any of the variety of programs performed by the controller 50; a Bluetooth connection process; and/or various updateable data for safekeeping such as paired device data, connection data, device contact information, etc. Certain of the above-noted components depicted in FIG. 1 are optional, and are displayed in phantom.

In certain cases, the controller 50 can include one or more microcontrollers or processors having a digital signal processor (DSP). In some cases, the controller 50 is referred to as control circuit(s). The controller(s) 50 may be implemented as a chipset of chips that include separate and multiple analog and digital processors. The controller 50 may provide, for example, for coordination of other components of the BT device 20, such as control of user interfaces (not shown) and applications run by the BT device 20. In various implementations, controller 50 includes a BT connection control module (or modules), which can include software and/or hardware for performing BT connection control processes described herein. For example, controller 50 can include a BT connection control module in the form of a software stack having instructions for controlling functions in BT device connection (e.g., between BT device 20 and additional BT devices 30, 40, etc.) according to any implementation described herein. As described herein, the controller 50 is configured to control functions in an RSSI-based connection approach according to various implementations.

The communication unit 60 can include the BT module 70 configured to employ a wireless communication protocol such as Bluetooth, along with additional network interface (s) such as those employing one or more additional wireless communication protocols such as IEEE 802.11, Bluetooth Low Energy, or other local area network (LAN) or personal area network (PAN) protocols such as WiFi. In particular implementations, communication unit 60 is particularly suited to communicate with other communication units 60 in BT devices 30, 40 via Bluetooth. In additional particular implementations, the communication unit 60 is configured to communicate with BT devices described herein using broadcast audio over a BLE or similar connection (e.g., including a proxy connection).

As noted herein, controller 50 controls the general operation of the Bluetooth-enabled device 20. For example, the controller 50 performs a process and control for audio and data communication. In addition to the general operation, the controller 50 initiates a Bluetooth function implemented in the Bluetooth module 70 upon detecting certain triggers (or, events), described herein. The controller 50 initiates an operation (e.g., connection) between BT device 20 and additional BT devices 30, 40, if specific conditions are satisfied.

The Bluetooth module 70 enables a wireless connection using Radio Frequency (RF) communication between the BT device 20 and additional BT devices 30, 40, etc. The Bluetooth module 70 exchanges a radio signal including data input/output through an antenna (not shown). For example, in a transmission mode, the Bluetooth module 70 processes data by channel coding and spreading, converts the processed data into a Radio Frequency (RF) signal and transmits the RF signal. In a reception mode, the Bluetooth module 70 converts a received RF signal into a baseband signal, processes the baseband signal by de-spreading and channel decoding and restores the processed signal to data. Additionally, the Bluetooth module 70 can ensure secured communication between devices, and protect data using encryption.

The additional BT devices 30, 40, etc. can include a controller 50a, 60b and communication unit 60a, 60b having a BT module 70a, 70b, enabling BT communication between BT device 20 and additional BT devices 30, 40. Additional BT devices 30, 40 can include one or more components described with reference to BT device 20, each of which is illustrated in phantom as optional in certain implementations. Notations "a" and "b" indicate that components in BT devices 30, 40 are physically separate from similarly labeled components in BT device 20, but can take a similar form and/or function as their labeled counterparts in BT device 20. Additional description of these similarly labeled components is omitted for brevity. Further, as noted herein, additional BT devices 30, 40 can differ from BT device 20 in terms of form factor, intended usage, and/or capability, but in any case, are configured to communicate with BT device 20 over Bluetooth.

In general, the Bluetooth module(s) 70, 70a, 70b include Bluetooth radios and additional circuitry. More specifically, the Bluetooth module 70 of the BT device 20 and the Bluetooth modules 70a,b of the BT devices 30, 40, etc. include both a Bluetooth radio and a Bluetooth LE (BLE) radio. In various implementations, presence of a BLE radio in the Bluetooth module 70 is optional. That is, as noted herein, various implementations utilize only a (classic) Bluetooth radio for connection functions. In implementations including a BLE radio, the Bluetooth radio and the BLE radio are typically on the same integrated circuit (IC) and share a single antenna, while in other implementations the Bluetooth radio and BLE radio are implemented as two separate ICs sharing a single antenna or as two separate ICs with two separate antennae. The Bluetooth specification, i.e., Bluetooth 5.2: Low Energy, provides the BT device 20 with forty channels on 2 MHZ spacing. The forty channels are labeled 0 through 39, which include 3 advertising channels and 37 data channels. The channels labeled as 37, 38 and 39 are designated as advertising channels in the Bluetooth specification while the remaining channels 0-36 are designated as data channels in the Bluetooth specification.

Figure 2:
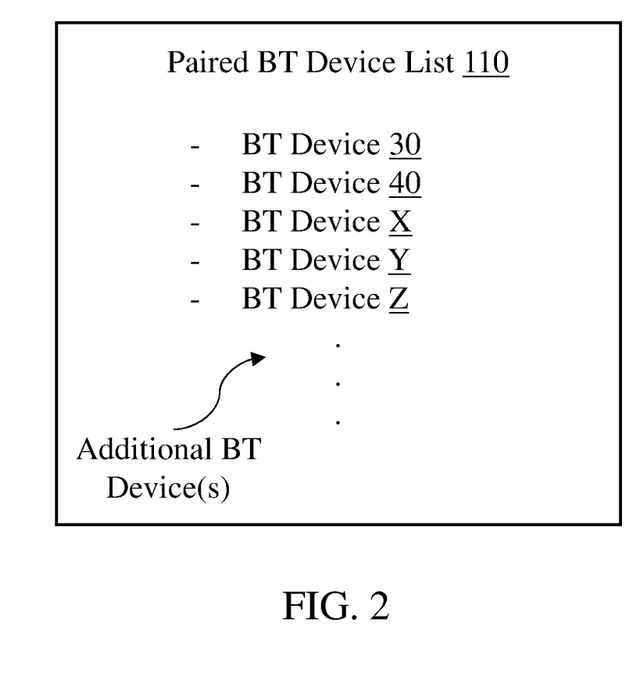
FIG. 2 is a schematic depiction of a paired BT device list according to various implementations.

As noted herein, various implementations are particularly suited for making device connection decisions among previously paired BT devices. As such, approaches described according to these implementations relate to connecting additional BT devices 30, 40, etc. with first BT device 20 where those additional BT devices have a pairing with BT device 20. FIG. 2 shows a paired BT device list (paired device list) 110 associated with BT device 20. In some cases, the paired device list 110 is stored in one or more portions of the memory at BT device 20, or is otherwise accessible to controller 50 in maintaining, updating or otherwise accessing the paired device list 110. In some cases, the paired device list 100 is arranged in terms of top-down priority, but in other cases, the priority of devices on the list 100 is arranged in any other priority scheme. As shown in this example, the paired device list 100 includes (additional) BT device 30 and (additional) BT device 40, along with further additional BT devices X, Y, Z, and spaces for still further additional BT devices. In certain examples, the BT device 20 is configured to maintain a paired device list 110 of several or more paired devices, which can include four, five, six, seven, eight or more paired devices. In particular cases, the paired device list 110 is made available to the user via an interface (e.g., audio interface, visual interface such as a display, etc.), e.g., for pairing additional devices with BT device 20. Pairing of devices on paired device list 110 with the BT device 20 can be performed according to any conventional approach, e.g., any conventional Bluetooth, BLE or other Bluetooth-related pairing approach. Certain example approaches of Bluetooth-related pairing are described in U.S. Pat. No. 9,066,327 (issued on Jun. 23, 2015), which is incorporated by reference in its entirety. Further, approaches for selecting and/or prioritizing connection between paired devices are described in U.S. patent application Ser. No. 17/314,270 (filed May 7, 2021), which is incorporated by reference in its entirety.

In certain examples, the paired device list 110 is prioritized in order to control connection between the BT device 20 and paired, additional BT devices, e.g., BT device 30, BT device 40, etc. In a particular example, the paired device list 110 is arranged in terms of top-down priority, such that in the example in FIG. 2, BT device 30 is given priority over BT device 40, which in turn has priority over BT device X, which in turn has priority over BT device Y, etc. In some examples, the paired device list 110 is prioritized based on at least one of: a recentness of connection with the first BT device, a frequency of connection with the BT device, a user-defined priority, a BT profile of a last connection with the first BT device (e.g., audio connection profile having higher priority than other connection profiles), whether the additional BT device is currently outputting audio, whether the additional BT device was recently powered on, a BT profile of a last connection with the first BT device 20, or a recent sweep of proximity to the first BT device 20 (e.g., using RSSI or any other proximity-based indicator such as an optical and/or acoustic sensor).

Figure 3:
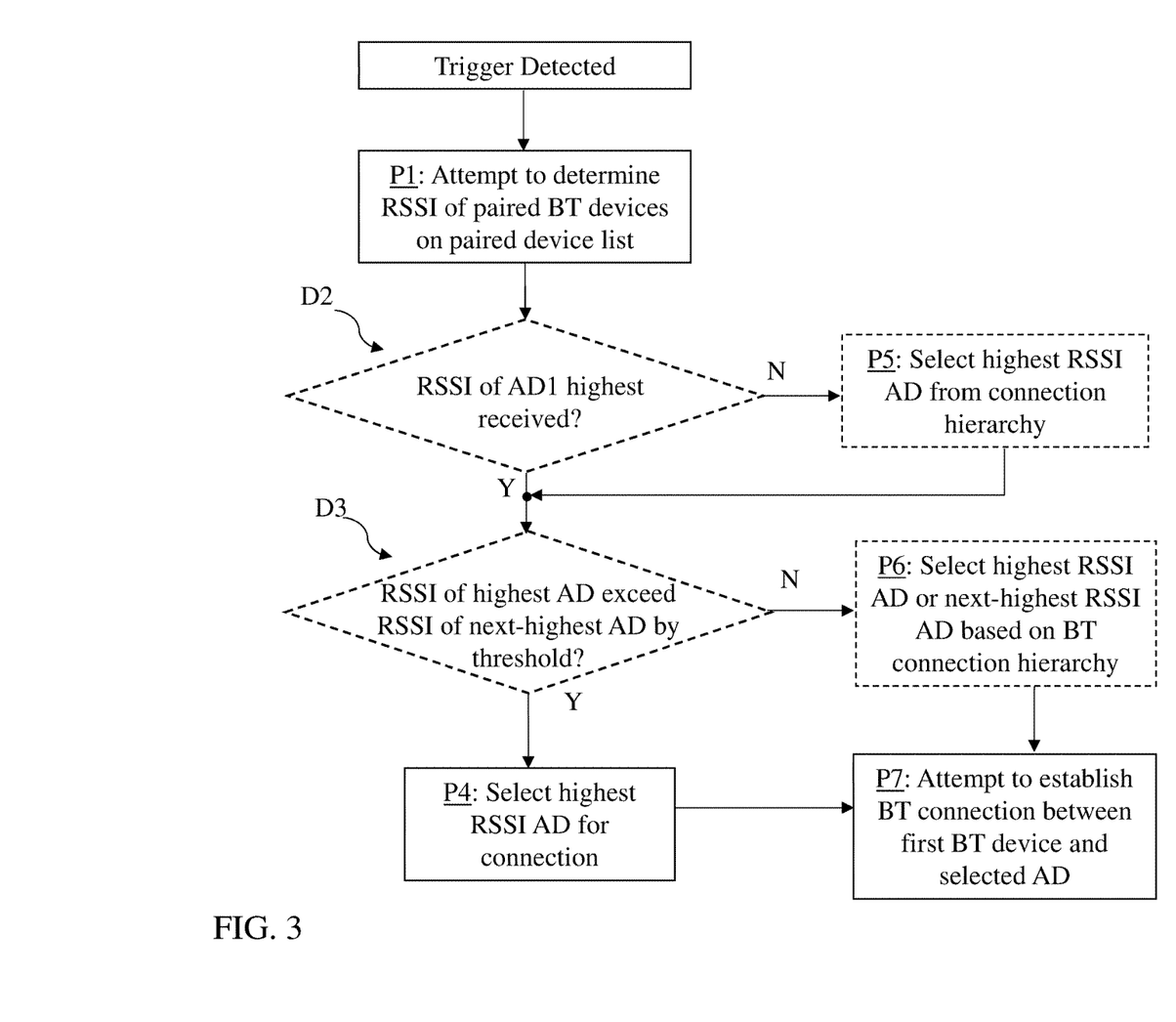
FIG. 3 is a flow diagram illustrating processes in a method according to various implementations.

With reference to FIGS. 1 and 2, according to various implementations, the controller 50 in BT device 20 is configured to enable proximity-based connection with BT devices on the paired device list 110, e.g., BT device 30, BT device 40, BT device X, etc. FIG. 3 is a flow diagram illustrating processes in controlling the proximity-based connection between BT device 20 and devices on paired device list 110. It is understood that the flow diagram in FIG. 3 illustrates an example configuration in which a first BT device 20 attempts to connect to up to two distinct BT devices, e.g., an additional BT device 30 and a further additional BT device 40. It is understood that the method illustrated can apply to a group of a few or more BT devices on the paired device list 110 as described herein. In various implementations, processes indicated by dashed lines are optional. Turning to FIG. 3, processes can include:

Process P1: in response to detecting a trigger at a first BT device (e.g., device 20) attempting to determine a received signal strength indicator (RSSI) of a set of additional BT devices paired to the first BT device 20 (e.g., devices from the paired BT device list 110, FIG. 2). In some cases, the trigger includes at least one of: detecting BT range between the first BT device 20 and the additional BT device (e.g., BT device 30), providing an input at the first BT device 20, initiating charging of another device (e.g., additional BT device(s) 30, 40, etc.), mechanically actuating the first BT device 20, receiving an input from the additional BT device (e.g., BT device 30), providing an input at the first BT device 20, a change in BT state of the first BT device 20 (e.g., BT enabled/disabled) a change in power state of the first BT device 20 (e.g., power on, power off, standby), detecting a change in the time of day, detecting loss of an existing BT connection with the first BT device (e.g., including subsequent attempt to connect to nearest BT device and/or device on list 110), or detecting loss of an existing Wi-Fi connection with the first BT device (e.g., including subsequent attempt to connect to nearest BT device and/or device on list 110).

It is understood that attempting to determine a received signal strength indicator (RSSI) of a set of additional BT devices need not cause those BT devices to lose their active connection with another device (e.g., a further BT device). That is, if one of the additional BT devices (e.g., on list 110) has an active connection with a BT device, Process P1 will not necessarily cause the additional BT device(s) to disconnect that active connection until a connection is established with the BT device 20, or at least until an attempt is made to establish a BT connection with BT device 20 (process P7, FIG. 3).

In particular implementations, the trigger includes a command to connect with a previously paired device (e.g., on device list 110), which is a distinct command from a new device connection command. In certain cases, this connection command is initiated without a user interface command, e.g., such as automatically detecting BT range between devices or initiating charging of a BT device. In additional implementations, the command to connect with a previously paired BT device (e.g., trigger) and the new device connection command are both interface commands enabled at an interface on the BT device 20. In particular examples, the connection command is a "quick-connect" or "simple-connect" command that includes an abbreviated interface command relative to a new device connection command. For example, the connection command for a previously paired device can include a single push command at a button or interface, as compared with a new device connection command that includes a press-and-hold command (e.g., for seconds). In particular implementations, the command to connect with a previously paired device places the controller 50 in a distinct connection mode than a command to connect with a new device. That is, the controller 50 is configured to detect a trigger indicative of a desire to connect with a previously paired device and initiate an operating mode with particular processes described herein.

In certain examples, the BT radio at BT device 20 detects the presence of the additional BT device within BT range, which acts as a trigger at the first BT device 20. In additional examples, the input at first BT device 20 includes: a button press (e.g., actuation of power button, BT connection button, or other volume adjustment button, or similar interface command at the first BT device 20); a command from a connected application (App), such as a power command, connection command, playback adjustment command; and/or a power on command at first BT device 20 or additional BT device(s) 30, 40, etc. In particular examples, mechanically actuating the first BT device 20 can include: opening a case housing the first BT device 20 (e.g., a headphone case, earbud case, audio eyeglasses case, etc.); and/or unpacking, opening or otherwise mechanically manipulating the first BT device 20 (e.g., opening a set of headphones or audio eyeglasses so as to prepare to don the device, moving an arm or mounting structure on a wearable audio device, positioning a speaker for resting on a surface, stepping onto or otherwise mounting a piece of exercise equipment, opening the door of a vehicle, triggering startup in a vehicle, etc.). In certain cases, receiving an input from the additional BT device (e.g., BT device 30) includes receiving BLE data indicating that the additional BT device (e.g., BT device 30) has moved into range of first BT device 20, or that BT was recently turned on at the additional BT device (e.g., BT device 30, or that the additional BT device (e.g., BT device 30) entered pairing mode, etc. Sensors in the additional electronics 100 (FIG. 1) can be configured to detect mechanical actuation, e.g., motion sensors, optical sensors, proximity sensors, etc. In certain cases, the form factor of the first BT device 20 will dictate available inputs and/or mechanical actuation mechanisms.

In a particular example, the trigger can include initiating charging of a BT device (e.g., first BT device 20) and/or using a BT device (e.g., first BT device 20) to charge an additional BT device (e.g., BT device 30). In some example configurations, a first BT device can initiate wireless charging of another BT device when placed within proximity and/or physical contact with each other. For example, a BT device such as BT device 30 can wirelessly charge another BT device such as BT device 20 using the on-board battery/batteries at the BT device 30, e.g., via inductive charging such as with a Qi wireless charger or similar wireless charger. In additional examples, the BT devices 20, 30 can charge one another in a wired charging configuration, e.g., via USB connector or other wired power connector. In various implementations, one of the BT devices charges the other BT device using on-board battery power. In some examples, initiation of the charging connection acts as the trigger described herein. In a particular non-limiting case, a first BT device (e.g., audio device 20, such as a BT speaker) can be configured to detect another BT device (e.g., audio device 30, such as a smart phone) that is positioned to charge via the BT speaker. The detection for charging purposes can include proximity-based charging detection, such as a Qi wireless charging connection of the smart phone with the BT speaker. The detection for charging purposes can also include a hard-wired connection (e.g., USB connection) and/or docking of the smart phone in a charging slot at the BT speaker. Detecting this charging connection can cause the BT speaker (BT device 20) to automatically perform processes described herein (e.g., with reference to FIGS. 3 and 4) to look for a BT device with the highest RSSI, which in this example, would be BT device 30. In optional additional implementations, initiating the charging connection between the first BT device 20 and additional BT device 30 triggers the first BT device 20 and/or the additional BT device 30 to automatically perform additional actions in response to establishment of a BT connection. Such additional actions are described further herein.

In various implementations, the additional BT devices are on the paired device list 110, i.e., each additional BT device(s) has an established pairing with the first BT device 20, and has previously connected with the first BT device 20. In the example illustrated in FIGS. 1 and 2, the controller 50 attempts to determine the RSSI of at least two BT devices 30, 40 due to their proximity to the first BT device 20. It is understood that process P1 can be applied to any number of BT devices within RSSI range, and as such, the controller 50 can be configured to attempt to determine the RSSI of three, four, or more paired BT devices (e.g., BT device X, BT device Y, BT device Z on list 110). In these cases, the BT device 20 can contemporaneously, or sequentially, send signals to two or more BT devices on the list 110 in an attempt to determine the RSSI from those BT devices.

In various implementations, using the example of FIG. 1, the controller 50 at BT device 20 initiates a signal via the BT module 70 to send data packets to the BT module 70a at BT device 30 and BT module 70b at BT device 40, and receives a return signal from each BT module 70a,b indicating a power at which those data packets are received (e.g., as a percentage of the power of the transmitted data packets). The transmitted and returned signals are both sent over channels designated as data channels in the Bluetooth specification, or "classic" Bluetooth (as opposed to BLE specification). In some cases, the controller 50 is configured to attempt to determine a plurality of RSSI from the BT devices 30, 40, e.g., in succession, in order to determine a mean RSSI, median RSSI or other mathematically-significant indicator of RSSI over a period. In certain cases, the mean RSSI over a period or a number of RSSI attempts is used for the purposes of connection approaches according to implementations. As noted herein, transmit power, environmental factors and other parameters can impact the measured RSSI value. While RSSI may be insufficient to calculate a position of an additional BT device (e.g., BT device 30) relative to the first BT device 20, RSSI can be used to calculate the relative proximity of multiple additional BT devices (e.g., BT device 30, BT device 40, BT device X, BT device Y, etc.) to the first BT device 20. That is, RSSI values can be used to determine whether BT device 30 is nearer to or farther from the first BT device 20 compared with BT device 40 and/or further additional BT devices X, Y, Z, etc. (e.g., on list 110). In particular implementations, physical separation of approximately six inches (approximately 15 centimeters) to approximately one foot (approximately 30 centimeters) relative to the first BT device 20 is detectable by a distinction between the highest RSSI value and the second-highest RSSI value. For example, if BT device 30 is approximately 10 centimeters from the first BT device 20 and BT device 40 is approximately 35 centimeters from the first BT device 20, the RSSIs received from devices 30, 40 will indicate physical separation between those devices 30, 40.

In various implementations, the RSSI from each of the additional BT devices (e.g., BT device 30, BT device 40, BT device X, BT device Y, etc.) is received within several seconds. In particular cases, the RSSI from each of the additional BT devices is received within approximately two seconds to approximately three seconds. In additional particular cases, the RSSI from each of the additional BT devices is received in less than two seconds, e.g., within one second to two seconds; and in some cases, in less than one second.

With continuing reference to FIG. 3, in an optional process performed after attempting to determine the RSSI of the BT devices on the paired device list 110 (e.g., BT device 30, BT device 40, etc.), in decision D2, the controller 50 determines whether the RSSI of a first BT device (additional device 1 (AD1), e.g., BT device 30) is the highest RSSI of the group of devices in which an RSSI was received. In certain cases, only one, two, three, etc. devices on the list 110 are within range to provide an RSSI response. As noted herein, the example in FIG. 3 is described with reference to two BT devices (e.g., AD1 and AD2, e.g., first BT device 30 and second BT device 40, respectively). In additional cases, only one device on the list 110 is within range to provide an RSSI response.

In certain cases, the determined highest RSSI (e.g., AD1) and determined second-highest RSSI (e.g., AD2) include normalized values based on a type of each of the BT devices, e.g., a type of BT device 30 and/or a type of BT device 40. For example, the RSSI values from one or more of the additional BT devices (e.g., BT devices 30, 40) can be adjusted or otherwise normalized to provide comparable values that are indicative of the distance between the additional BT devices and the first BT device 20. In certain cases, the RSSI values of distinct additional BT devices are normalized based on a known characteristic of one or more of those devices (e.g., an RSSI characteristic), for example, a strength of a BT transmitter at one or more of first BT device 30, second BT device 40, etc. In a particular example, first BT device 30 includes a laptop or a tablet computing device with a BT transmitter having a first (relatively higher) strength and second BT device 40 includes a smart phone or a smart watch with a BT transmitter having a second (relatively lower) strength. In normalizing the RSSI values received from the first and second BT devices 30, 40 in this example scenario, the controller 50 reduces the RSSI value from the first BT device 30 and/or increases the RSSI value from the second BT device 40 to account for the known distinction in the BT transmitters. Additional examples of known RSSI characteristics of a BT device can include, e.g., whether the BT device has a chipset that provides greater RSSI, or whether device is currently outputting audio, and/or whether device was recently powered on. Additional factors impacting RSSI can include whether other active BT radios are within the vicinity, device usages (e.g., higher power usage v. lower power usage), environmental factors such as temperature and/or humidity, obstacles, antenna types, orientation, environmental reflection and absorption of the signal, product exterior material(s), etc. Normalizing RSSI values can be based on one or more of the above-noted RSSI characteristics.

In additional optional process, if yes to decision D2 (RSSI of AD1 is the highest received), in decision D3 the controller 50 determines whether the RSSI of the first BT device 30 exceeds RSSI of the second BT device 40 by a threshold. In certain cases, the threshold is indicative of a physical separation (relative to BT device 20) between the first BT device 30 and the second BT device 40. That is, as noted herein, physical separation between devices of at least approximately 15 cm to approximately 30 cm can be reliably detected by distinctions in RSSI. In particular cases, the threshold accounts for a margin of uncertainty in the RSSI value. This margin of uncertainty can be impacted by distinctions in device RSSI characteristics (e.g., BT transmitter strength and/or class of device). In certain examples, the margin of uncertainty increases as the physical distance between BT devices 30, 40 and BT device 20 reduces (i.e., devices get closer together). For example, the margin of uncertainty can be greatest when the highest RSSI and the next-highest RSSI (from BT devices 30, 40, X, Y, etc.) indicates proximity of up to approximately two feet (or approximately 60 cm) to approximately three feet (or approximately 90 cm) relative to BT device 20. The threshold can include a value or a range of values that can account at least in part for the margin of uncertainty in the RSSI values from the BT devices. In certain cases, the threshold can be set at a percentage or range of percentages (of the transmitted signal strength), a fixed value or range of values (e.g., in arbitrary units, or power level (dBm)), or a variable value or range of values (e.g., differing based on known signal strength conditions of the additional BT devices 30, 40, and/or known conditions about the environment). In certain non-limiting examples, the threshold is equal to approximately 0.5 to approximately 3.5 decibel-milliwatts (dBm), and in particular non-limiting examples, approximately 1 dBm to approximately 3 dBm, and in further particular non-limiting examples, approximately 2 dBm. In a particular example, the controller 50 is configured to use a hysteresis factor to wait for fluctuating RSSI values from a given device (e.g., BT device 30, BT device 40) to stabilize prior to finalizing decision D3.

If Yes to decision D3, in process P4, the controller 50 is configured to select the first additional device (e.g., BT device 30) for BT connection.

Returning to decision D2, in another optional process, if the RSSI of AD1 is not the highest RSSI received (N to decision D2), in process P5 the controller 50 selects a second BT device (e.g., AD2 such as second BT device 40) or an additional BT device from the list that has the highest RSSI. After selecting the BT device with the highest RSSI, the process returns to decision D3 as described herein to compare the devices with the highest RSSI and next-highest RSSI, respectively.

If decision D3 is a no (N), i.e., the additional device with the highest RSSI does not have an RSSI value that exceeds the RSSI of the next-highest RSSI device by the threshold, in optional process P6, the controller 50 is configured to select between the highest RSSI device (e.g., BT device 30) and the next-highest RSSI device (e.g., BT device 40) based on a BT connection hierarchy. In certain cases, the hierarchy of BT connection is defined by the list 110 (FIG. 2), such that a higher priority connection is listed at the top of the list and a lower priority connection is listed at the bottom of the list. In additional cases, one or more of the criteria for sorting the list 110 can be used to determine the hierarchy of a BT connection, e.g., recentness of connection with BT device 20, frequency of connection with BT device 20, whether the additional BT device is currently outputting audio, etc.

In process P7, after selecting an additional BT device for connection, the controller 50 attempts to establish a BT connection between the first BT device 20 and the selected additional device, e.g., BT device 30, BT device 40 or another BT device from list 110.

While various processes in FIG. 3 are illustrated, it is understood that certain of these processes can be optionally deployed to connect two BT devices. For example, processes P1, P4 and P7 can be performed serially without intervening decisions (e.g., decisions D2, D3) and optional processes (e.g., processes P5, P6) associated with such decisions. In this example scenario, the process includes attempting to determine a received signal strength indicator (RSSI) of a set of additional BT devices paired to the first BT device 20 (e.g., in response to detecting a trigger at BT device 20), selecting an additional BT device (e.g., BT device 40) with the highest RSSI for connection, and attempting to establish a BT connection between BT device 20 and BT device 40.

In various implementations, the approaches described with respect to FIG. 3 are configured to provide an efficient and effective means of connecting a desired additional BT device (e.g., BT device 30, BT device 40, etc.) with the first BT device 20, based primarily on physical proximity (e.g., as indicated by RSSI). That is, if at least two BT devices on the list 110 return an RSSI response (to process P1), the RSSI response from those BT devices is used as a primary factor for selecting the additional BT device for connection with the first BT device 20, and the BT connection hierarchy (e.g., on list 110) is used as a secondary factor in selecting the additional BT device for connection with the first BT device 20. In particular cases, the processes described according to various implementations can enable selection of the additional BT device with the highest RSSI within several seconds.

In certain additional implementations, the controller 50 at a BT device or BT devices is configured to perform optional actions automatically after detecting a BT connection between BT devices (e.g., a BT connection between BT device 20 and BT device 30). For example, establishing a BT connection between BT device 20 and BT device 30 can automatically initiate (i.e., without further user intervention such as a user interface command or other user-initiated trigger) at least one of: a) an application to launch at the first BT device 20 (e.g., a media control application such as the Bose Hear audio control application provided by Bose Corporation, Framingham, MA, a power control/monitoring application, a fitness application, etc.) in cases where the first BT device 20 is capable of launching a software application (e.g., with smart device capabilities); b) a playlist, podcast, audio track, etc., to begin playing; c) personalization settings to be applied (e.g., noise cancelation settings, equalization settings, hear-through settings, etc.); d) a predefined volume level to be set at either or both of the BT devices 20, 30; e) changing the sound output configuration at either or both BT devices 20, 30; and/or f) changing the transmit/receive parameters between BT devices 20, 30 based on device type(s), content transmitted and/or proximity e.g., to reduce latency.

In some examples noted above, personalization settings can be adjusted and/or applied where the additional BT device 30 is a wearable audio device and detects connection with a source BT device 20 having a known characteristic and/or location. For example, if the BT device 30 is a headphone, audio eyeglasses, or other wearable audio device and detects connection with BT (source) device 20 that is known to be at the user's office, home, gym, etc., the BT device 30 can apply particular personalization settings based on the known location of the BT device 20. For example, detecting the connection with BT device 20 being a work computing device can cause the BT device 30 to apply a noise cancelation setting (e.g., mid to high noise cancelation) and an equalization setting that enhances playback of work-related music or other content (e.g., classical music playback). In particular examples, sound output configurations can be adjusted at BT device 20 and/or BT device 30 in response to detecting the connection between the BT devices 20, 30. In one example, BT device 20 is a speaker such as a soundbar, and BT device 30 is a set of headphones (or other wearable audio device), and detecting connection between the BT devices 20, 30 (e.g., via SimpleSync™ connection provided by Bose Corporation, or similar connection,) can adjust an output configuration to mute or reduce the volume of output at one of the BT devices while audio playback is occurring at the other BT device. In one example, the BT device 20 is a speaker and the BT device 30 is a wearable audio device (e.g., headphones), and after the connection is detected between the BT devices 20, 30, the controller 50 at BT device 20 mutes its own audio output. In still further cases, the automatic optional processes performed by controller(s) 50 at one or both BT devices 20, 30 includes changing the transmit/receive parameters between BT devices 20, 30 based on device type(s), content transmitted and/or proximity e.g., to adjust latency. For example, transmit/receive parameters between BT devices 20, 30 can be adjusted based on the type of content transmitted (e.g., to reduce latency for playback of video content, or enhance range for playback of audio content). In some cases, transmit/receive parameters between BT devices 20, 30 can be adjusted periodically and/or continuously based on updated RSSI values for BT devices 20, 30.

Figure 4:
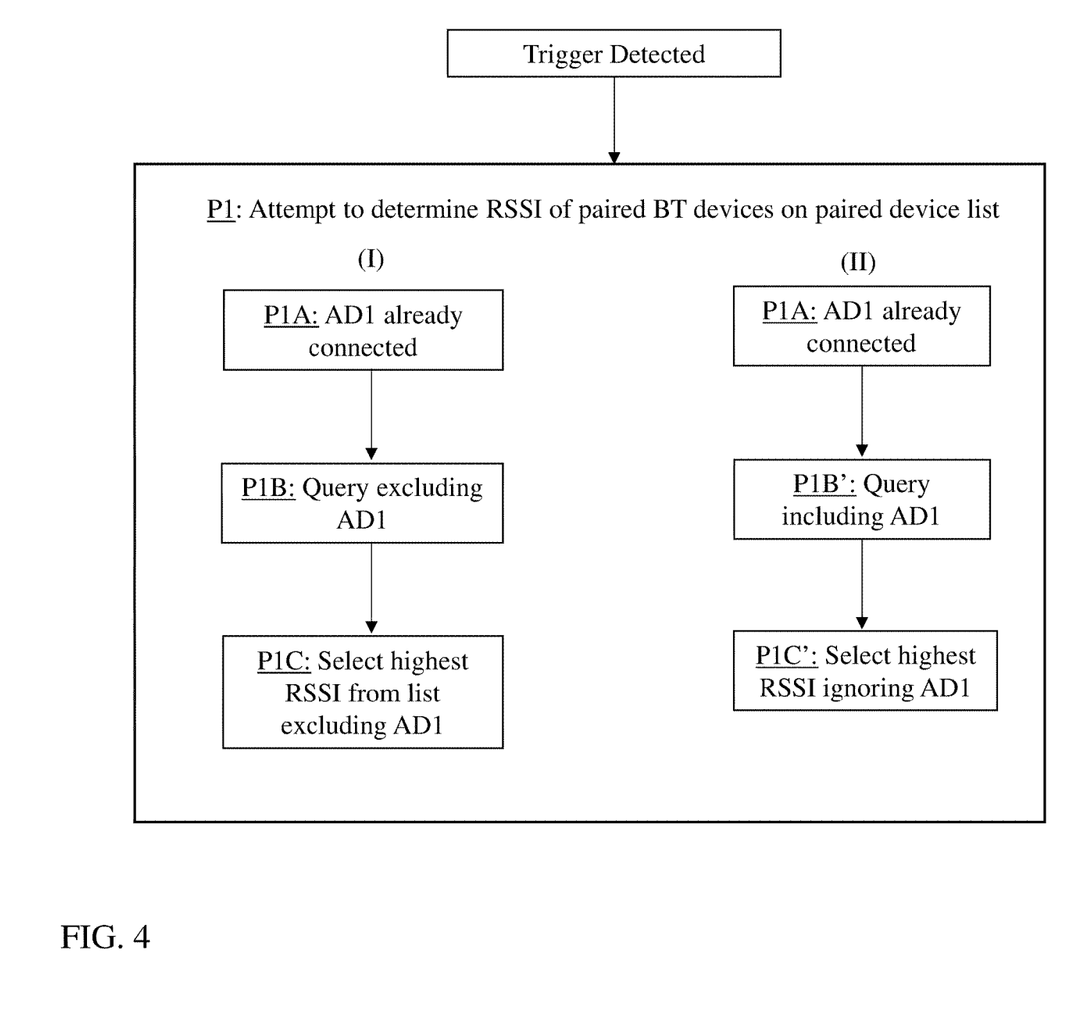
FIG. 4 is a flow diagram illustrating processes in a method according to various additional implementations.

As noted herein, the processes described with reference to FIG. 3 can include attempting to establish a BT connection with BT devices that are paired with the first BT device 20, have each previously connected with the first BT device 20 with a BT connection, and are not currently connected with the first BT device 20. In additional implementations, as illustrated in FIG. 4, certain processes are configured to be performed while the first BT device 20 is connected with an additional BT device (e.g., BT device 30) from the list 110. Certain of these processes are described in terms of an operating mode of the controller 50, which in some examples, is denoted as a multi-point connection mode. In particular examples process P1 can include sub-processes for handling scenarios where the first BT device 20 is already connected with an additional BT device when detecting the trigger. Sub-processes are separated into a first path (I) and a second path (II), each having the same initial process PIA of determining that a first additional device (e.g., BT device 30) is already connected with the first BT device 20. In path (I), process P1B includes querying additional devices on the list 110 (e.g., within RSSI range) excluding the first additional device (e.g., BT device 30). In these cases, the controller 50 attempts to determine an RSSI from the other BT devices on the list 110 exclusive of the first additional device (e.g., BT device 30). In process PIC, the controller 50 selects the additional device (e.g., BT device 40) with the highest RSSI from the responses received from additional devices on the list 110. In contrast, in path (II), the controller 50 in process P1B' queries additional devices on the list 110 (e.g., within RSSI range) including the already connected first additional device (e.g., BT device 30). In this path (II), in process P1C', the controller 50 selects the highest RSSI from the responses received from additional devices on the list 110, ignoring the received RSSI from the connected first additional device (e.g., BT device 30). In the above-noted description of sub-processes in P1, the RSSI from the currently connected BT device is disregarded either before or after receiving an RSSI from the additional devices on the list 110. In these cases, the controller 50 infers that the trigger is not an attempt to connect already connected, powered-on devices.

In certain implementations, the above-noted processes in paths (I) or (II) can also be performed for a most-recently connected additional device or a recently connected additional device such as a BT device that was connected to the BT device 20 within several minutes or less of the trigger (e.g., within several seconds in particular cases). In a particular non-limiting example, the list 110 is updated at least partly based on recentness of connections, and is updated within a matter of minutes or seconds. In these cases, the recently connected additional device is treated as though it is already connected, and the controller 50 infers that the trigger is intended to initiate connection with a distinct additional device from list 110.

In various additional implementations including the multi-point connection mode, the controller 50 is configured to maintain a BT connection with the currently connected BT device (e.g., BT device 30) after detecting the trigger to connect with another BT device. That is, with reference to FIGS. 3 and 4, the controller 50 can be configured to maintain a current BT connection with a device (e.g., BT device 30) for any period between detecting the trigger and attempting to establish a BT connection between the first BT device 20 and the selected additional device from list 110 (process P7). In certain cases, the BT connection with the currently connected BT device is maintained until the desired additional device is selected for connection, e.g., in process P4 or process P6.

Returning to FIG. 3, in another particular multi-point connection mode example, the controller 50 is configured to initiate a connection with two distinct BT devices at the same time. In this example, the trigger includes a power-up command at the BT device 20 (e.g., where BT device 20 is powered down or in a sleep state). In response to the power-up command and prior to selecting the additional BT device for connection (e.g., in process P7), the controller 50 is configured to connect with two distinct BT devices having a highest and next-highest RSSI response, e.g., following process P1. In these cases, the controller 50 connects with both BT devices (e.g., BT device 30 and BT device 40) and after one of the BT devices is selected for connection (e.g., in process P4 or process P6), the controller 50 disconnects the other BT device. In one example, the controller 50 receives a trigger including a power-up command at the BT device 20. In response to the power-up command, the controller 50 attempts to determine an RSSI from the set of additional BT devices, receiving RSSI responses from BT device 30 and BT device 40. The controller 50 then initiates BT connection with both BT device 30 and BT device 40. In this example, decision D2 to process P6 are performed (as described herein) to select the likely intended connection between BT device 30 and BT device 40. For example, BT device 40 is selected for connection, either via process P4 or process P6. In this case, once the BT device 40 is selected for connection, the controller 50 disconnects the BT connection with BT device 30.

In various implementations, the multi-point connection mode is selectable via a user interface command, e.g., any user interface command described herein. In a particular example, the multi-point connection mode is selectable via a user interface at the first BT device 20 and/or via a software application (or, app) running on a connected device (e.g., a smart device) for controlling BT functions at the first BT device 20.

The list 110 of BT devices described herein (FIG. 2) can be filtered, periodically or in response to a trigger (e.g., selecting a lower priority BT device on the list, or adding or subtracting a BT device from the list 110). In certain examples, the filtering includes removing or reprioritizing a duplicate BT device, a BT device incapable of outputting audio, a device currently connected to the first BT device 20, a device most recently connected to the first BT device 20, a device that is unresponsive to connection attempts, or secondary devices in a paired or grouped device system. For example, filtering can include removing a second earbud in a wireless pair (e.g., where both are discoverable by BT), or a second or additional speaker in a stereo pair or stereo group (e.g., where the separate speakers are discoverable by BT). In certain of these cases, only a single, representative BT device is considered for priority in the list 110. Additionally, the duplicate BT device can be removed from the list 110 or placed in a low priority slot on the list 110. In still further implementations, a BT device that is incapable of outputting audio can be removed from the list 110 or otherwise deprioritized. In some instances, the list 110 is filtered periodically, e.g., to remove unresponsive devices, duplicate devices such as two instances of the same device as in the example of earbuds, or secondary devices in a paired or grouped device system such as worker speaker(s) in a master-worker group. In various implementations, periodically filtering the list 110 increases the speed of future connection attempts by reducing the chances of attempting to connect with a device that is unlikely to be the desired device connection.

While the controller 50 is configured to control connection between BT devices according to RSSI-based approaches, these features can be disabled or otherwise bypassed on the first BT device 20 and/or any additional BT devices capable of performing the herein-noted processes. For example, in some cases, the controller 50 is configured, in response to a user command, to attempt to establish a BT connection between the first BT device 20 and an additional BT device (e.g., highest-priority BT device 30) without determining an RSSI of that additional BT device. That is, in response to a user command, the controller 50 can be configured to apply a conventional approach to connecting the BT device 20 with the highest-priority BT device on list 110, which in various cases is the most recently connected additional BT device or the most frequency connected additional BT device. User commands can take any form described herein, e.g., a voice command, tactile interface command such as a button press, gesture-based command such as a head nod or head shake, an interface command made via a connected application (App), either at the BT device 20 or on another connected device such as a smart phone or tablet, etc. In still further implementations, the controller 50 can be configured to apply any other conventional connection approach in response to a user command, such that the RSSI-based approaches described herein can be selected or deselected as part of an operating mode of the BT device(s).

In any case, the approaches described according to various implementations have the technical effect of enhancing Bluetooth based connection between already paired devices. For example, approaches disclosed according to various implementations can improve the accuracy of intended device connections, as well as reduce latency in connections when compared with conventional approaches. Because conventional Bluetooth-based connection approaches rely on the unreliable and/or inconsistent signals received over Bluetooth, those approaches often involve repeated attempts to connect devices, each of which has its own associated latency. Further, the Bluetooth signal range is greater than the RSSI range, so a larger number of BT devices, at a greater separation distance, are considered in the conventional connection approach. In contrast, the disclosed RSSI-based approach can narrow the group of potential paired BT devices for connection based on the received RSSI, which is necessarily indicative of proximity. These approaches can avoid the false positive connections, and delays that frustrate users.

Even further, the use of RSSI as the primary factor in selecting from the paired device list prioritizes proximity (or inferred proximity) in the BT connection determination, increasing the likelihood of a desirable connection. These approaches can be particularly useful in enhancing the user experience where a single previously-paired BT device is within RSSI range of the sink device, and/or in scenarios where multiple different previously-paired BT devices are within range of one another (e.g., multiple different sink devices within BT range of a source device). These RSSI-based approaches can also enable expeditious processing of connection options for multiple devices, e.g., effectively selecting between devices when multiple RSSI responses indicate close proximity.

Take an example scenario where a user wishes to connect a smart phone (as a source device) with a speaker or wearable audio device (as a sink device) in her living room. The user's home also has a tablet computer upstairs in a bedroom and a laptop in an office that is separate from the living room. The tablet was most recently connected with the speaker (or wearable audio device). In a conventional approach, the user can initiate a trigger, such as powering on the speaker or wearable audio device while the smart phone is powered on. In some cases, the user may trigger a Bluetooth connection button or other interface command, while in other cases, the devices are configured to automatically attempt a connection. In any case, in response to the trigger, the conventional approach will attempt to connect the speaker with the most recently connected device in Bluetooth range, which in this case, is the tablet in the bedroom upstairs. In certain instances, the conventional approach will attempt to connect the speaker with the tablet multiple times until detecting a stable connection, which can take up to several seconds per connection attempt. Even if successful in connecting the speaker with the tablet, the user attempting to connect the smart phone in the same room as the speaker is frustrated because her intended device connection has been bypassed based on Bluetooth range and recency of connection. The user may have to enter or otherwise engage a menu (e.g., a visual menu, or an audio interface) for one or more of the BT devices to select the intended connection between the speaker and the smart phone.

In contrast, the approaches according to various implementations attempt to determine an RSSI of the paired BT devices on the device list prior to attempting to make the BT connection. Because the RSSI is a strong indicator of device proximity, not all devices that are within Bluetooth range will qualify for connection using the disclosed approaches. In the above-noted example, the smartphone may not receive an RSSI from the tablet computer upstairs, or may receive a very weak RSSI from that tablet computer. Additionally, the speaker or wearable audio device (as a sink) would receive a clear differentiation between the RSSI response from the smart phone in the same room as compared with the laptop in the separate office. As such, even if the tablet computer and/or the laptop are higher on the priority list than the smart phone that the user wishes to connect, the clear distinction in RSSI response (e.g., exceeding the threshold) makes the smart phone the clear choice for BT connection. These approaches can efficiently and automatically arrive at the intended connection between the smart phone and the speaker that are in the same room as one another, providing a more intuitive approach than conventional recency-based (or priority-based) rules. This is one of many example benefits of the disclosed approaches when considered in view of conventional systems and methods.

The above description provides an embodiment that is compatible with BLUETOOTH SPECIFICATION Version 5.2 [Vol 0], 31 Dec. 2019, as well as any previous version(s), e.g., version 4.x and 5.x devices. Additionally, the connection techniques described herein could be used for Bluetooth LE Audio, such as to help establish a unicast connection. Further, it should be understood that the approach is equally applicable to other wireless protocols (e.g., non-Bluetooth, future versions of Bluetooth, and so forth) in which communication channels are selectively established between pairs of stations. Further, although certain embodiments are described above as not requiring manual intervention to initiate pairing, in some embodiments manual intervention may be required to complete the pairing (e.g., "Are you sure?" presented to a user of the source/host device), for instance to provide further security aspects to the approach.

In some implementations, the host-based elements of the approach are implemented in a software module (e.g., an "App") that is downloaded and installed on the source/host (e.g., a "smartphone"), in order to provide the pairing capability according to the approaches described above.

While the above describes a particular order of operations performed by certain implementations of the invention, it should be understood that such order is illustrative, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, unless otherwise noted, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A method comprising:
   in response to a trigger at a first BT device, attempting to determine a received signal strength indicator (RSSI) from a set of additional BT devices paired to the first BT device, and
   in response to determining a first additional BT device has a highest RSSI from the set of additional BT devices, attempting at the first BT device to make a BT connection with the first additional BT device.

2. The method of claim 1, wherein the trigger includes a command to connect with a previously paired device on a paired device list.

3. The method of claim 1, further comprising,
   making the BT connection with the first additional BT device, and
   automatically taking an additional action in response to the BT connection,
   wherein automatically taking the additional action is performed without further user intervention.

4. The method of claim 3, wherein the additional action includes at least one of, launching an application at the first BT device, initiating an audio output at one or both of the first BT device or the first additional BT device, applying personalization settings to the first BT device, setting a predefined volume level at one or both of the first BT device or the first additional BT device, adjusting a sound output configuration at one or both of the first BT device or the first additional BT device, or changing at least one of transmit parameters or receive parameters between the first BT device and the first additional BT device.

5. The method of claim 1, wherein if at least two BT devices in the set of additional BT devices return an RSSI response, the RSSI response from each of the at least two additional BT devices is used as a primary factor for selecting the first additional BT device from the set of additional BT devices, and a BT connection hierarchy including a paired device list is used as a secondary factor in selecting the first additional BT device from the set of additional BT devices.

6. The method of claim 5, further comprising filtering the paired device list periodically or in response to a filtering trigger.

7. The method of claim 1, wherein in a paired configuration, the first BT device is a sink BT device and the additional BT devices are source BT devices.

8. The method of claim 1, wherein in a multi-point connection mode, prior to attempting to connect with the first additional BT device, maintaining a BT connection with a currently connected BT device after detecting the trigger, and
   disregarding an RSSI from the currently connected BT device either before or after receiving an RSSI from the set of additional BT devices paired to the first device.

9. The method of claim 1, wherein the first additional BT device is selected from the set of additional BT devices paired to the first BT device.

10. The method of claim 1, further comprising normalizing the received RSSI based on a type of each of the set of additional BT devices.

11. A first Bluetooth (BT) device comprising:
    a BT radio; and
    a controller coupled with the BT radio and configured to control a BT connection by,
      in response to a trigger at the first BT device, attempting to determine a received signal strength indicator (RSSI) from a set of additional BT devices paired to the first BT device, and
      in response to determining a first additional BT device has a highest RSSI from the set of additional BT devices, attempting to make a BT connection with the first additional BT device.

12. The BT device of claim 11, wherein the trigger includes a command to connect with a previously paired device on a paired device list.

13. The BT device of claim 11, wherein the controller is further configured to,
    make the BT connection with the first additional BT device, and automatically take an additional action in response to the BT connection,
    wherein automatically taking the additional action is performed without further user intervention.

14. The BT device of claim 13, wherein the additional action includes at least one of, launching an application at the first BT device, initiating an audio output at one or both of the first BT device or the first additional BT device, applying personalization settings to the first BT device, setting a predefined volume level at one or both of the first BT device or the first additional BT device, adjusting a sound output configuration at one or both of the first BT device or the first additional BT device, or changing at least one of transmit parameters or receive parameters between the first BT device and the first additional BT device.

15. The BT device of claim 11, wherein if at least two BT devices in the set of additional BT devices return an RSSI response, the RSSI response from each of the at least two additional BT devices is used as a primary factor for selecting the first additional BT device from the set of additional BT devices, and a BT connection hierarchy including a paired device list is used as a secondary factor in selecting the first additional BT device from the set of additional BT devices.

16. The BT device of claim 15, wherein the controller is further configured to, filter the paired device list periodically or in response to a filtering trigger.

17. The BT device of claim 11, wherein in a paired configuration, the first BT device is a sink BT device and the additional BT devices are source BT devices.

18. The BT device of claim 11, wherein in a multi-point connection mode, prior to attempting to connect with the first additional BT device, maintaining a BT connection with a currently connected BT device after detecting the trigger, and disregarding an RSSI from the currently connected BT device either before or after receiving an RSSI from the set of additional BT devices paired to the first device.

19. The BT device of claim 11, wherein the first additional BT device is selected from the set of additional BT devices paired to the first BT device.

20. The BT device of claim 11, wherein the controller is further configured to normalize the received RSSI based on a type of each of the set of additional BT devices.

\* \* \* \* \*